United States Patent [19]

Good

[11] Patent Number: 4,928,395
[45] Date of Patent: May 29, 1990

[54] EXTENSIBLE LEVEL
[76] Inventor: Laverne C. Good, R.D. #4 Box 331B, Reading, Pa. 19606
[21] Appl. No.: 362,017
[22] Filed: Jun. 6, 1989
[51] Int. Cl.⁵ .............................................. G01C 9/24
[52] U.S. Cl. ........................................ 33/374; 33/382
[58] Field of Search ......................... 33/379, 380–383, 33/342, 332, 375, 374, 809, 498, 451, 485, 494, 295

[56] References Cited
U.S. PATENT DOCUMENTS

| | | | |
|---|---|---|---|
| 1,413,056 | 4/1922 | Parrish et al. | 33/374 |
| 3,104,477 | 9/1963 | Edwill | 33/374 |
| 3,161,964 | 12/1964 | Myles | 33/809 |
| 4,130,943 | 12/1978 | Talbot | 33/374 |
| 4,336,655 | 6/1982 | Thingstad | 33/809 |
| 4,607,437 | 8/1986 | McSorley, Sr. et al. | 33/381 |

Primary Examiner—William A. Cuchlinski, Jr.
Assistant Examiner—Daniel G. DePumpo
Attorney, Agent, or Firm—Steele, Gould & Fried

[57] ABSTRACT

An extensible carpenter's level includes a pair of body members in end-to-end relationship and a pair of extenders mounted in face-to-face relationship on the body members. The extenders are slideably retained in tracks on the body members. The body members have longitudinal slots and the extenders have locking means passing from the extenders through the longitudinal slots on the body members for locking the body members and extenders into relative position. The body members, and preferably also the extenders, have level indicating means thereon, and are separable from the device as a whole for convenient individual use. When assembled, the body members can be slid apart to accommodate a desired length within a span up to about twelve feet, the reference edges of the body members remaining co-linear at any extension length.

9 Claims, 2 Drawing Sheets

EXTENSIBLE LEVEL

BACKGROUND OF THE INVENTION

1. Field of the Invention

This invention relates to an extensible level which can be elongated to extend the base of a level measurement, and which also can be separated into separately-useful level components in a range of sizes.

2. Description of the Prior Art

Carpenter's tools often include at least one level mechanism, normally a transparent curved tube or barrel-shaped tube filled with a liquid except for a bubble that seeks the highest point. Pendulum levels are known but are less common. The level, e.g. tube, is mounted on some form of a housing that is placed against a straight edge to be checked by viewing the bubble in the tube. The tube is mounted on the housing at a predetermined orientation relative to a flat reference edge of the housing. The flat reference edge is placed against a straight edge on a structural member such as a stud, doorjamb, etc., to be checked for correct alignment. While many hand tools such as try-square tools may have a level device built into them, a tool having a short housing for the level necessarily will be sensitive to short variations in linearity of the edge to be checked, and may not accurately reflect -the alignment of a member which is substantially longer than the housing of the level. For optimum accuracy, the flat edge of the level housing should have a length at least as long as the member to be checked. High quality carpenter's levels are often quite long, for example up to two meters in length. On the other hand, a level which is longer than the member to be checked is unnecessarily cumbersome. A variety of choices for lengths of the level are desirable, whereby for convenience and for checking short members a shorter level is available and for accuracy over the span of an elongated member a longer level can be used as well. Of course, the user is not interested in obtaining and maintaining a large number of tools which individually are only seldom used. Accordingly, there has been a need for a conveniently length-variable leveling tool to eliminate the need to carry several pieces of equipment while retaining convenience and full span.

Metrulis U.S. Pat. No. 3,522,657 and Conn U.S. Pat. No. 4,317,289 disclose extensible rule/level combinations which are pivotable at a hinge and therefore become longer when unfolded. However, the Conn device is extensible only to the extent of the length achieved when its parts are at 180 degrees to one another. Moreover, any pivotable level configuration is potentially inaccurate in that the respective segments may not be exactly co-linear when deployed for a measurement. The Metrulis device has pairs of level components pivoted together at their adjacent ends, with various arrangements as to positions available, including adjustable sections with 90 degree and 45 degree level tubes, and locking means for maintaining the selected position of the pivotable halves while the tool is being used in a particular position. These adjustments present the benefit of convenience as well as a possibility of error. Both of the devices shown in these references are intended as multi-function tools, for example being capable of functioning as squaring tools.

The standard configuration for a tool to be used only as a level (i.e., not a multi-function tool which happens to include a level) is similar to a straightedge. Straightedge rules are known that include levels and achieve extensibility for making length measurements by telescoping a graduated scale. Metrulis U.S. Pat. No. 3,522,657 shows both a hinging level and also a telescoping extensible scale or rule. Although extending the telescoping rule does extend the length of the entire device, such extending is not helpful as an extension of the effective length of the level. The extension is only useful as an extension of the scale or rule. This is true because the rule is narrower than the housing from which the rule telescopes and the edge of that housing is the flat edge to which the level indicating mechanism (e.g., spirit level) is referenced. The stepwise decrease in width precludes an extensible flat edge to be used in adjustable length leveling. Other similar devices are disclosed in Peterson et al., U.S. Pat. No. 4,099,331 and Jansson U.S. Pat. No. 4,399,616 in which rules are extensible from the ends of levels. These devices cannot be accurate as extensible levels because any reading is referenced to an uncertain line from the level housing to the extended rule end, which is not co-linear with the reference edge of the level housing.

Heater U.S. Pat. No. 3,762,058 is slightly different. This patent discloses a telescoping-scale measuring instrument which employs telescoping tubes or rods to provide for length measuring. In this case the device has the level mechanism disposed at the end of the smaller, extensible tube rather than on the wider housing In the same manner as above, however, a reading taken from end point to end point of the variably-extended rule will not be based on a non-varying line of reference.

While these previous patents disclose multiple-component pivoted or extensible tools having squaring, leveling, and/or measuring functions and are presumably effective for their respective intended uses, no previous device is characterized by an adjustably extensible level which has one or more level mechanisms referenced to a straight edge defined by co-linear edges of separable, separately useful level components in convenient lengths, does not fold, and which provides for level readings taken on the same line of reference at both ends of the level, regardless of the extent to which the device is extended.

SUMMARY OF THE INVENTION

An extensible carpenter's level has at least a pair of body members, each body member separably slideably attached to telescope in relation to one another and at least one level mechanism indicating at least one predetermined orientation, for example one or both of horizontal and plumb (vertical) level orientations. Each body member of the pair is preferably I-shaped or H-shaped in cross section and includes pairs of longitudinal extensions to form sliding tracks along the bottom and top of the "I" (c.f., sides of the "H"), parallel to the central leg of the I or H. At least one extender functioning as a base, and preferably an aligned pair of extenders, are slideably retained in the sliding tracks, the extenders being fixed relative to one another in coextensive face-to-face relationship and the body members normally being stowed or retracted into abutting end-to-end relationship, or deployed into extended spaced relationship, by sliding the body members along the extenders. The reference edge of the level is defined by an edge along the body members and the reference edges of at least the endmost body members are co-linear. It is preferred that the extenders be generally U-shaped with squared legs of a U shape riding in the sliding tracks along the body members. This U-shape prevents the extenders from wobbling in the tracks and keeps the extenders parallel, thus ensuring that the body members both have edges residing along the same line of reference to provide accurate level readings By sliding the body members toward and away from each other, the overall length of the carpenter's level is adjusted.

It is preferred that the two body members be of dissimilar lengths, the shorter body member being about two feet long or shorter and the longer body member being about four feet long. The extenders are preferably about five and a half feet long. Thus, when either body member component is used alone, the carpenter has a choice of the two foot level and the four foot level. Moreover, the extender also can include one or more level mechanisms, whereby the carpenter may also choose a five and a half foot level. If the body members and extenders according to this example are kept assembled, the level adjusts to any desired length between about six feet and about eleven feet. Because the body members do not telescope out of a wider or narrower edge-defining housing, but rather are connected and similarly mounted on a common extender, the reference edges defined by the body members at each end of the assembled level reside along the same line. The level of the invention will give convenient and accurate readings on objects having a length anywhere from about one foot, e.g., for checking short structural members or taking rough reading on longer members, up to about twelve feet, e.g., for overall measurements along longer structural members, floors and the like.

It is preferred that the body members and extenders be made from extruded aluminum. It is also preferable for versatility of use that each said spirit level window be provided with both horizontal and plumb levels. Spirit levels are preferred, i.e., having a curved-wall viewing vial filled with liquid except for a mobile bubble. Other levels (e.g., pendulum type) are also possible.

The body members and extenders can be controllably loosened or locked into the desired relative positions by turning thumb screws which are located on the extenders with their shafts extending through the longitudinal slots in the body members.

It is an object of this invention to provide a convenient extendible level, adjustable in length to correspond as desired to the length of an article to be leveled.

It is another object of this invention to provide a multiple-piece carpenter's level in which the reference edges of the respective pieces are always aligned.

It is a further object of this invention to provide a multiple-piece carpenter's level, which when disassembled, has independently usable leveling sub-elements in convenient lengths.

It is still another object of this invention to provide a multiple-piece carpenter's level which has three or four independently usable members in different lengths.

It is yet a further object of this invention to provide an extensible level which is suitable for measuring the angle of articles having a length from as little as about one foot to about twelve feet, and wherein the available range of lengths does not make measurements at the shortest span unwieldy and inconvenient at the longest, or vice-versa.

It is still a further object of this invention to provide an extensible level with members having dissimilar convenient It is yet another object of this invention to provide an extensible level in which, when the level is fully extended, reference edges at both ends of the level are precisely co-linear.

It is yet another object of this invention to provide a level which employs both horizontal and plumb levels at each window of a spirit level.

These and other objects will be more readily ascertainable to one skilled in the art from a consideration of the following figures, description and exemplary embodiments, with the understanding that the drawings are illustrative only and that changes may be made in the specific construction illustrated and described within the scope of the appended claims.

DETAILED DESCRIPTION OF THE PREFERRED EMBODIMENTS

Figure 1:
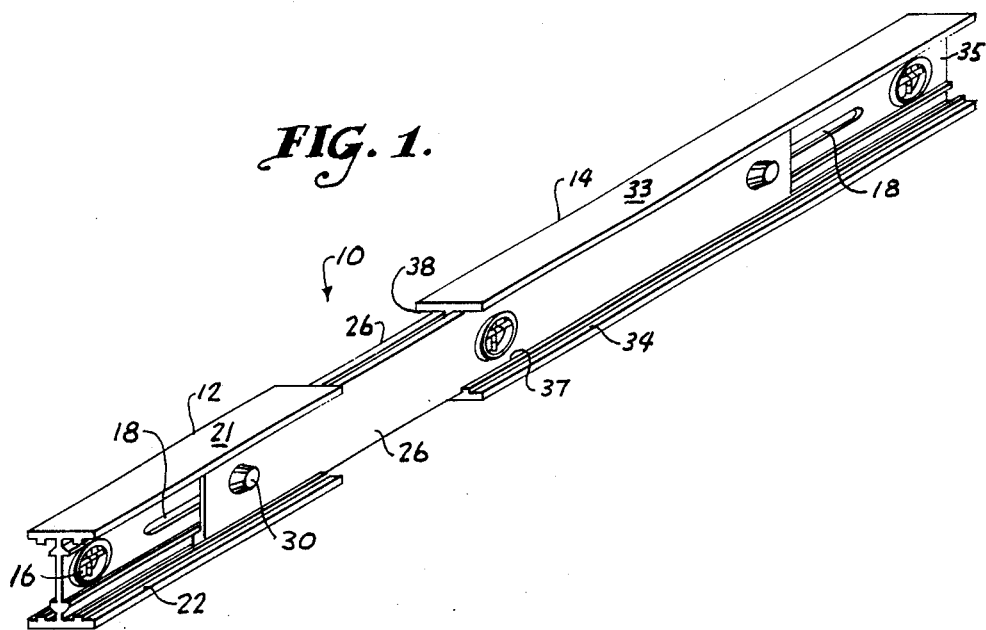
FIG. 1 is a perspective view of the completely assembled extensible level of the invention.
Figure 2:
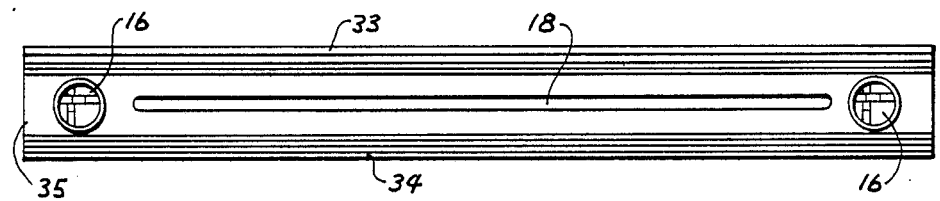
FIG. 2 is a side view of the longer body member on the right side on FIG. 1.
Figure 3:
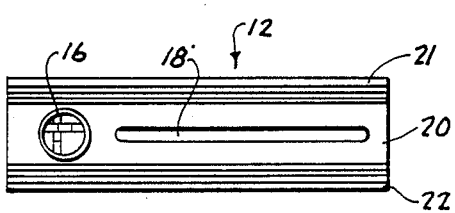
FIG. 3 is a side view of the shorter body member on the left side of FIG. 1.

Referring now to the drawings, and more particularly to FIGS. 1, 2 and 3, a perspective view shows the assembled extensible carpenter's level 10 of this invention and side views show details of the body members 12 and 14. Extensible level 10 preferably has four parts, namely shorter body member 12, longer body member 14 and two extenders 26, although it is possible to provide elongation with only one extender 26. Each body member is a complete and functional carpenter's level and can be used alone. The shorter body member 12 (preferably 2 feet long) is short enough for work with small articles or to conveniently make rough measurements of longer articles. The longer body member 14 (preferably 4 feet long) is apt for use in conventional full scale leveling applications in construction as well as home use. Each body member has at least one window, each window including a set 16 of horizontal and plumb levels. Because body member 14 is longer and is comparable in length to a standard level, it is preferred that member 14 include a window with spirit and plumb levels at each opposite end of member 14. Each body member 12,14 also includes a longitudinal slot 18 extending almost the entire length of the member. The body members are slideably attached relative to the extender member(s) such that the overall device is length extendible, but at any length the body members at the ends of the device have reference edges that are precisely co-linear.

Figure 3A:
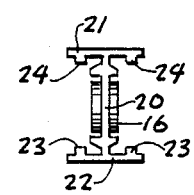
FIG. 3a is an end view of the member of FIG. 3.
Figure 4:
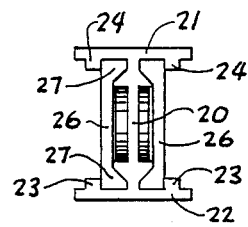
FIG. 4 is an end view of the left end of FIG. 1, the body members assembled with the extenders in their respective tracks.

In FIGS. 3 and 3a, body member 12 is shown in side and end views. Body member 12 is I-shaped or H-shaped in cross section, depending on one's point of view. Member 12 has top 21, bottom 22 and connecting section 20. Extruded flanges 23 and 24, defining a slide enclosure running lengthwise along body member 12, form tracks on the top 21 and bottom 22 of the body member 12. The flanges 23,24 define outer walls of the slide tracks for the telescopically attached extenders 26, confining them with the connecting section 20 defining an inner wall of the slide track. The flanges 23,24 can be formed as spaced short tabs that rest against the extenders at intervals, however it is preferred that the flanges be continuous lengths along the body members, extruded as continuous flanges integrally attached to the rest of the respective body member. Extenders 26 slide in the track formed by the ex-truded flanges walls and the connecting portion 20, as illustrated in FIG. 4.

Figure 5:
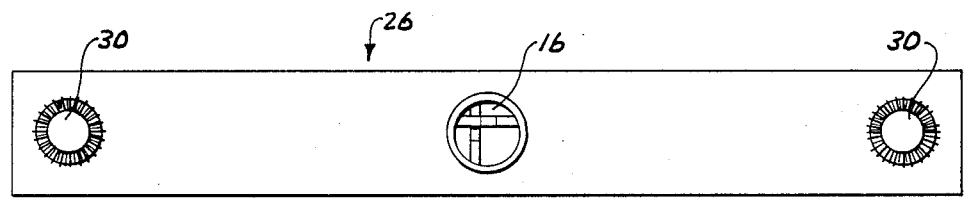
FIG. 5 is a side view of an extender of FIG. 1, the other extender being identical.
Figure 6:
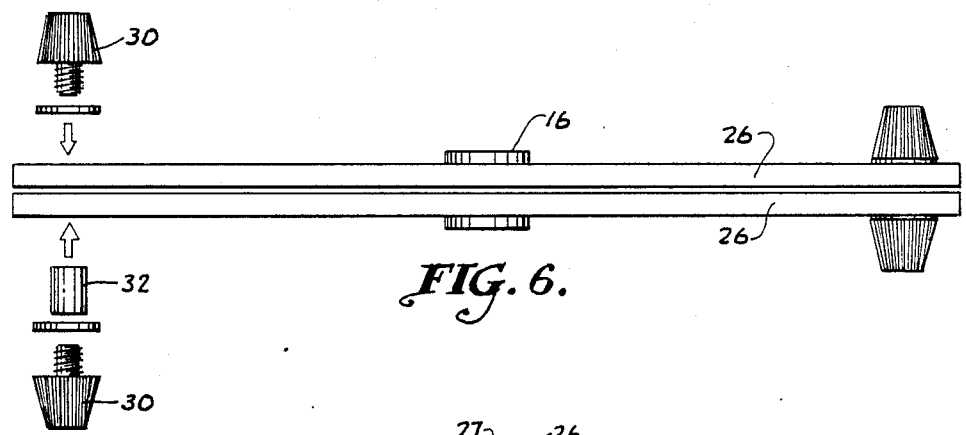
FIG. 6 is a top view of the extenders secured to each other by locking means and without the body members; and, FIG. 7 is an end view of the extenders of FIG. 6.
Figure 7:
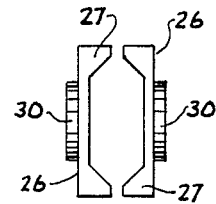

Now referring to FIGS. 5, 6 and 7, the preferred pair of extenders 26 are shown in side, top and end views, respectively. It is preferred that the extenders be generally U-shaped, with squared ends 27 for firm retention in the sliding track of the body members 12,14. By providing squared ends 27 for the extenders 26, rather than extenders 26 being simple straight plates, the body members 12,14 are prevented from leaning off vertical and the readings in the spirit level sets 16 at the ends of the body members 12,14 remain accurate, even when the body members 12,14 are locked into position at the very ends of the extenders 26. The engagement between the body members and the extenders should be snug enough that there is little or no play that would permit the reference edges of the body members to diverge from co-linear. The slidable interlocking of legs 27 of extenders 26 between the extrusions 23,24 on body member 12 (shown in FIG. 4) provides for both the adjustability and the accuracy of the extensible level of this invention. Although not illustrated specifically, the body member 14 slideably retains extenders 26 in the same manner as shown for body member 12 in FIG. 4.

As seen in FIGS. 1, 5 and 6, thumb screws are provided for locking the assembled carpenter's level 10 at a desired length. The thumbscrews 30 may be used alone or with bushing 32, for example a nylon or brass bushing facilitating sliding.

An extensible carpenter's level according to the invention as disclosed includes a pair of body members, 12,14, each body member having at least one level 16, which may be horizontal or vertical or otherwise aligned at a desired orientation, the body members being related in an end-to-end arrangement. An extender 26 is mounted in face-to-face relationship with body members 12,14 such that the body members 12,14 are slidable along the extender 26. Locking means 30,32 on extender 26 and body members 12,14 lock body members 12,14 into relative position on the extender 26. The extensible carpenter's level 10 can include a pair of body members 12,14 including longitudinal slots 18. A pair of extenders 26 are mounted in face-to-face relationship in the body members, riding in tracks formed by extrusions 23 and 24 on the top and bottom of the preferably I-shaped or H-shaped body members 12,14. Both body members 12,14 include level sets 16 having both horizontal and plumb levels, and the extenders may also include levels 16. Locking means 30,32 lock the body members into a desired length position on extenders 26. Body members 12,14 are of dissimilar lengths, but extenders 26 are identically sized and always aligned.

There are several variations which can be practiced in the scope of this invention. Chiefly, the extender 26 may be a single unit which accepts both body members in slidable relationship, or, as is preferred, the extender is provided in pairs on which the body members 12,14 are slidably mounted. Each body member 12,14 may be used independently as a horizontal and/or plumb level. Each body member may have one or more level mechanisms, for example accommodating a plurality of different orientation angles. The extenders 26 also may be provided with sets of plumb and horizontal levels, making the extenders usable independently as levels. Thumb screws 30 are provided as locking means, but other adjustable locking means, such as wing nuts and bolts, or the like, are within the scope of this invention. The extensible carpenter's level of this invention is usable in several combinations and disassembles into four component parts, two body members and two extenders, which are easily transported and stored. Because it neither hinges or telescopes by releasing a smaller rule from a larger rule-, the extensible carpenter's level of this invention gives accurate level readings for articles of a great variety of lengths. Although it is preferred that the tracks on the body members be formed by extrusions on the top and bottom of an I-shaped body member, grooves or other track means are within the scope of this invention.

Having now illustrated and described my invention, it is not intended that such description limit this invention, but rather that this invention be limited only by reasonable interpretation of the appended Claims.

I claim:

1. An extensible carpenter's level comprising:
   at least a pair of body members, each said body member having a level means indicating at least one orientation angle of the level at a reference edge of said body member, said body members being related in an end-to-end arrangement such that reference edges of at least endmost ones of the body members are co-linear, said body members being I-shaped in cross section with a connecting portion and bottom and top base portions, said base portions having longitudinal extensions parallel to and forming top and bottom tracks with said connecting portion;
   an extender mounted on said body members such that the body members are slidable along the extender, said extender being slideably retained in said top and a bottom opposing track of said body members, said extender mounted coextensively such that the body members are slidable along the extender in said tracks; and,
   locking means on said extender and said pair of body members for locking the body members into relative portion on the extender.

2. An extensible carpenter's level comprising:
   at least a pair of body members, each said body member having a level means indicating at least one orientation angle of the level at a reference edge of said body member, said body members being related in an end-to-end arrangement such that reference edges of at least endmost ones of the body members are co-linear, said body members being I-shaped in cross section with a connecting portion and bottom and top base portions, said base portions having longitudinal extensions parallel to and forming top and bottom tracks with said connecting portion, said extensions extruded from the top and bottom bases of said body members;
   an extender mounted on said body members such that the body members are slidable along the extender, said extender being slideably retained in said top and a bottom opposing track of said body members, said extender mounted coextensively such that the body members are slidable along the extender in said tracks; and, locking means on said extender and said pair of body members for locking the body members into relative position on the extender.

3. The extensible level of claim 1 wherein said longitudinal extensions are extruded from said bases of said body members.

4. The extensible level of claim 1 wherein said extender is comprised of two U-shaped members, each leg of each said U-shaped member riding in one said track.

5. The extensible level of claim 1 wherein said body members have dissimilar lengths.

6. The extensible level of claim 1 wherein said locking means include sets of interlocking thumbscrews for urging together the body members and the extender.

7. The extensible level of claim 6, further comprising a bushing and wherein said thumbscrews engage the bushing.

8. The extensible level of claim 1 wherein said each said body member includes a plurality of spirit levels.

9. The extensible level of claim 1 wherein the extender includes at least one spirit level.

* * * * *